United States Patent [19]

Fanta et al.

[11] 4,134,863
[45] Jan. 16, 1979

[54] HIGHLY ABSORBENT GRAFT COPOLYMERS OF POLYHYDROXY POLYMERS, ACRYLONITRILE, AND ACRYLIC COMONOMERS

[75] Inventors: George F. Fanta; Edward I. Stout, both of Peoria; William M. Doane, Morton, all of Ill.

[73] Assignee: The United States of America as represented by the Secretary of Agriculture, Washington, D.C.

[21] Appl. No.: 748,032

[22] Filed: Dec. 6, 1976

[51] Int. Cl.$^2$ .............................................. C08L 3/02
[52] U.S. Cl. ........................... 260/17.4 GC; 128/285; 128/290 R; 128/290 P; 195/63; 195/68; 195/DIG. 11; 210/43; 210/54; 252/312; 260/17.4 ST; 260/17.4 CL; 260/891
[58] Field of Search ............... 260/29.6 H, 29.6 HN, 260/29.6 AN, 17.4 ST, 17.4 GC

[56] References Cited

U.S. PATENT DOCUMENTS

| | | | |
|---|---|---|---|
| 3,455,853 | 7/1969 | Dekking | 260/17.4 GC |
| 3,457,198 | 7/1969 | Sobolev | 260/2.2 |
| 3,770,673 | 11/1973 | Slagel | 260/17.4 GC |
| 3,785,921 | 1/1974 | Ide et al. | 260/17.4 ST |
| 3,826,767 | 7/1974 | Hoover et al. | 260/17.4 GC |
| 3,889,678 | 6/1975 | Chatterjee | 260/17.4 GC |
| 3,929,706 | 12/1975 | Schmidt et al. | 260/17.4 ST |
| 3,984,361 | 10/1976 | Gugliemelli et al. | 260/17.4 ST |
| 3,997,484 | 12/1976 | Weaver et al. | 260/17.4 ST |
| 4,025,472 | 5/1977 | Lepoutre | 260/17.4 GC |
| 4,028,290 | 6/1977 | Reid | 260/17.4 GC |
| 4,072,640 | 2/1978 | Sosa | 260/17.4 GC |
| 4,076,663 | 2/1978 | Masuda et al. | 260/17.4 GC |

*Primary Examiner*—Edward M. Woodberry
*Attorney, Agent, or Firm*—M. Howard Silverstein; David G. McConnell; Curtis P. Ribando

[57] ABSTRACT

Absorbent compositions comprising graft copolymers of acrylonitrile and starch, or related polyhydroxy polymers, are prepared by improved methods of synthesis. Mixing the acrylonitrile with selected water-soluble acrylic comonomers enables unexpected improvements including reduction of the saponification time, total elimination of the base-saponification step, elimination of the starch gelatinization step, preparation of products which absorb large amounts of aqueous fluids under highly acidic conditions, and preparation of products which absorb over 5000 times their weight of deionized water.

13 Claims, No Drawings

HIGHLY ABSORBENT GRAFT COPOLYMERS OF POLYHYDROXY POLYMERS, ACRYLONITRILE, AND ACRYLIC COMONOMERS

BACKGROUND OF THE INVENTION

1. Field of the Invention

Our invention relates to the preparation of polyhydroxy polymer (PHP)-polyacrylonitrile (PAN) graft copolymer compositions which absorb up to several thousand times their weight of deionized water and proportionately large quantities of other aqueous fluids.

2. Description of the Prior Art

Polymeric substances which possess the ability to absorb aqueous fluids are known in the prior art. For example, U.S. Pat. No. 3,669,103 and 3,810,468 disclose that a variety of monomers may be polymerized, with crosslinking, to give polymeric absorbents. The crosslinking reaction is of critical importance, since the uncrosslinked polymers are water soluble and thus have no utility as absorbents.

Water-absorbing alkali metal salts of saponified granular starch-PAN graft copolymers are disclosed in U.S. Pat. No. 3,661,815. In this disclosure, starch is graft polymerized in the granule state, and the saponification is carried out in an alcohol-containing medium to obtain a granular insoluble absorbent. U.S. Pat. No. 3,932,322 discloses a mixture of the composition of U.S. Pat. No. 3,661,815 with fumed silica or alumina. This mixture exhibits an increased rate of fluid uptake and a decreased tendency toward dusting.

Water-absorbing alkali metal salts of saponified gelatinized starch-PAN graft copolymers are disclosed in U.S. Pat. No. 3,935,099, herein incorporated by reference. In this disclosure, starch is gelatinized by heating in water prior to graft polymerization; also, the graft copolymer is saponified in water to give a viscous dispersion of highly swollen but still insoluble microgel particles. Contrary to the absorbent composition of U.S. Pat. No. 3,661,815, the composition of U.S. Pat. No. 3,935,099 may be dried to a continuous film which has an unusually high absorbency for aqueous fluids. Moreover, this film-forming tendency permits a variety of substrates to be coated with thin films of the absorbent composition and thus leads to dramatic increases in fluid absorbencies of the substrates.

SUMMARY OF THE INVENTION

It is an object of this invention to provide novel PHP graft copolymer absorbents which are prepared by faster and simpler methods than the copolymer absorbents described in the prior art. Specifically, objectives of the invention are to reduce the time needed to saponify a PAN-containing PHP graft copolymer, to eliminate the base-saponification step altogether, and to eliminate the gelatinization step when the PHP is starch or a starch-containing material. Further objectives of the invention are to prepare PHP graft copolymer absorbents which absorb aqueous fluids under highly acidic conditions, and also to prepare PHP graft copolymers which are substantially more absorbent than any polymeric absorbent described in the prior art.

In accordance with these objectives, we have surprisingly discovered that by the inclusion of selected water-soluble acrylic comonomers other than acrylonitrile in the PAN side chains attached to the PHP backbones of the graft copolymers, the preparation of the copolymers can be simplified in the above-mentioned respects, and products can be prepared with absorbency properties equal to or even vastly superior to the graft copolymers of the prior art. For example, the saponification time of either a gelatinized or a granular starch-PAN graft copolymer can be reduced by as much as a factor of 7.5. In another embodiment, wherein a mixture of acrylonitrile and 2-acrylamido-2-methylpropanesulfonic acid is graft polymerized onto gelatinized starch and the product subjected to alkaline saponification, graft copolymer compositions can be prepared which absorb over 5000 times their weight of deionized water.

DETAILED DESCRIPTION OF THE INVENTION

Useful as starting materials in the instant invention are the polyhydroxy polymers (PHP) as well known to the skilled artisan. Of particular interest are the natural PHP such as starch, cellulose, and certain starch- and cellulose-containing materials. Exemplary starch-containing materials, without limitation thereto, are yellow corn flour, bleached pregelatinized corn flour, soft wheat flour, and whole ground corn meal. Wood pulp would be a suitable cellulose-containing substance. Insofar as substantially pure starch is the preferred starting material, it will frequently be used in the ensuing disclosure as illustrative of the envisioned PHP's with the understanding that other PHP's may be substituted therefor as substantial equivalents.

It is well known that unmodified starch in the granule state is insoluble in water at ambient temperatures. It is also known that when a water suspension of unmodified granular starch is heated, the starch granules reversibly take up water with limited swelling and then, at a definite temperature, typically about 70° C., the granules undergo irreversibly a sudden rapid swelling. As the temperature is increased beyond about 70° C., the granules become more swollen and disrupted, and a higher percentage of starch is solubilized until, at a temperature of about 80°–100° C., a smooth, viscous dispersion is obtained. Starch or starch-containing materials in this form will be referred to as gelatinized.

Polyacrylonitrile-containing starch graft copolymers are well known in the prior art, and the various methods used to synthesize these graft copolymers have been reviewed by Fanta, *Block and Graft Copolymerization*, R. J. Ceresa, ed., John Wiley and Sons, 1973, Chapter 1. In Fanta's review, the influence of such variables as type of initiator used, type of pretreatment of starch, kinds of polymerization media employed, amounts of monomer used, and the like on starch graft copolymer compositions are considered. Although acrylonitrile (AN) is the preferred monomer for use in the basic graft copolymers of the instant invention, it is understood that methacrylonitrile is equivalent to the acrylonitrile monomer specified in the claims.

The selected comonomers which are operatively admixed with the acrylonitrile for accomplishing the above objectives are the water-soluble acrylic monomers other than acrylonitrile and methacrylonitrile. Examples of these without limitation thereto are acrylic acid, methyl acrylate, acrylamide, and 2-acrylamido-2-methylpropane sulfonic acid (AASO$_3$H). These comonomers graft copolymerize with the acrylonitrile onto the PHP substrate. The resulting polyhydroxy polymer-synthetic copolymer will hereafter be referred to as PHP-SC. The preferred ratio of PHP:SC is in the range 50:50 to 40:60; however, it is understood that graft copolymers with ratios outside this range as high as 75:25 and as low as 25:75 would also function as absorbents and would also show the desirable properties claimed in the instant invention, although perhaps to different extents.

The preferred polymerization initiators are the ceric ammonium nitrate-nitric acid system and the ferrous sulfate-hydrogen peroxide redox system described in the examples. However, other suitable initiating systems, for example, cobalt-60 irradiation or ozone will be known to those skilled in the art.

Saponification of the PHP-SC is carried out in water with any alkali metal hydroxide, preferably sodium hydroxide or potassium hydroxide. It would also be obvious to use ammonium hydroxide, preferably in combination with an alkali metal hydroxide. The preferred mole ratio of alkali to monomeric unit of synthetic copolymer is in the range of 0.6:1 to 1:1, although it is obvious that mole ratios within the range of 0.1:1 to 7.2:1 would also cause saponification to take place. Saponifications are preferably carried out in water, although it is obvious that water-containing mixtures, such as ethanol-water, can also be used. The graft copolymer is contacted with an aqueous solution of alkali metal hydroxide at a temperature of 90°–100° C. Higher temperatures can also be used, if saponifications are run in pressure vessels. Reaction mixtures initially assume a red-orange color, when then slowly fades to a light yellow as the reaction nears completion. The progress of a saponification can thus be followed by the color of the reaction mass, and a light yellow color indicates that saponification is complete. Saponification converts the nitrile substituents of PAN to a mixture of carboxamide and alkali metal carboxylate, the ratio of which is typically on the order of 1:2 but may vary with conditions. The saponified PHP-SC is water-soluble in a pH range from about 5 to about 12. "Water-soluble" as used throughout the disclosure is defined herein to include the state of being apparently soluble or highly dispersed.

It is known from U.S. Pat. No. 3,935,099 that saponification of the PAN moiety in a PAN-containing starch graft copolymer typically requires 1 to 3 hr. at 90° C. when the saponification is carried out in water as described above. In agreement with these findings, we have observed, in control experiments, that a gelatinized starch-PAN graft copolymer containing 59% synthetic polymer required 90 min. for saponification at 95°–100° C., while a graft copolymer prepared from granular starch and containing 55% PAN required 75 min. We were therefore surprised to find that the time needed to saponify a PAN-containing graft copolymer could be reduced by as much as a factor of 7.5 if minor amounts, that is, about 1–30 mole percent, of selected comonomers were mixed with acrylonitrile when the graft copolymer was prepared. At 90°–100° C., saponification can be completed in as little as 10–45 min. For example, with gelatinized starch, the incorporation of 5 mole percent $AASO_3H$ with 95 mole percent acrylonitrile permitted the saponification time to be shortened to 32 min. Incorporation of 10 mole percent acrylamide permitted complete saponification in 27 min., 10 mole percent acrylic acid permitted saponification in 20 min., and 10 mole percent methyl acrylate permitted saponification in 40 min. When a mixture of 20 mole percent acrylamide and 80 mole percent acrylonitrile was graft polymerized onto either granular or gelatinized starch, the saponification was complete in a remarkable 12–13 min.

Obviously, the major benefit to be derived from these shorter reaction times is that saponifications may now be carried out in continuous processes instead of in the batch-wise processes currently required by the lengthy 1 to 3 hr. saponification time. Shorter processing times would, of course, be economically favorable in any commercial process.

Reasons for the shortened saponification times are not immediately apparent. Although the comonomers which confer shorter saponification times on the starch graft copolymers are largely highly water soluble, this high water solubility is not a prerequisite, since 10 mole percent methyl acrylate, with a water solubility of only 5.2% at 30° C., shortens saponification time by over a factor of 2. In contrast to $AASO_3H$, vinyl sulfonic acid, which is not only highly water soluble but which also bears a sulfonic acid group similar to $AASO_3H$, exhibits no shortening of saponification time when mixed with acrylonitrile in an amount equal to 5 mole percent. These examples all provide evidence for the unpredictable and therefore unexpected nature of the influence of acrylic comonomers on saponification time.

U.S. Pat. No. 3,935,099 teaches that absorbent polymer compositions prepared by saponifying gelatinized starch-PAN graft copolymers have a much higher absorbency for aqueous fluids than similar compositions prepared from granular starch. In agreement with these findings, we have observed, in control experiments, that an absorbent polymer composition prepared from gelatinized starch absorbed 820 g. of water and 40 g. of a synthetic urine per gram of polymer, as compared with 298 g. of water and 28 g. of synthetic urine per gram of similar absorbent polymer compositions prepared from granular starch. Synthetic urine was prepared by dissolving 0.64 g. of $CaCl_2$, 1.14 g. of $MgSO_4.7H_2O$, 8.20 g. of NaCl, and 20.00 g. of urea in 1000 g. of water. It was therefore an unexpected finding that fluid absorbencies of absorbent polymer compositions prepared from granular PAN-containing starch graft copolymers could be made to equal or surpass those derived from gelatinized starch-PAN, if minor amounts of selected comonomers were mixed with acrylonitrile when the granular starch graft copolymer was prepared. For example, when granular starch was graft polymerized with a 10:90 mole ratio of $AASO_3H$:acrylonitrile and the graft copolymer saponified with sodium hydroxide, the resulting absorbent polymer composition absorbed 968 g. of water and 47 g. of synthetic urine per gram of polymer.

This unexpected improvement in absorbency permits us to use a greatly simplified starch graft copolymer synthesis, since the gelatinization of starch is no longer necessary to attain the highly absorbent polymer compositions. Besides being time consuming, the gelatinization of starch requires energy in the form of heat, and the hot gelatinized starch dispersion must then be cooled back to lower temperatures before graft polymerization. Also, when gelatinized starch is used, the final graft copolymer is partially colloidal and is thus difficult to filter or centrifuge. However, when granular starch is graft polymerized, the final graft copolymer is not colloidal but is in the granular state and may thus be easily separated from unreacted monomer and other impurities by filtration or centrifugation prior to saponification with aqueous alkali. It may also be separated and stored as a wet filter cake for extended periods of time prior to saponification.

All of the prior art which is related to saponified starch-PAN graft copolymer absorbents teaches that saponification is a necessary step in the preparation of these absorbents. Although the saponified starch graft copolymer absorbents remain insoluble in water, they are highly hydrophilic and have a great affinity for water, swelling to many times their original size when placed in contact with aqueous fluids. Polyacrylonitrile, however, is a highly hydrophobic polymer, and before saponification it is insoluble in water and remains virtually unswollen when placed in aqueous fluids. When starch is grafted with polyacrylonitrile, the graft copolymer assumes the properties of the synthetic moiety and similarly remains insoluble and unswollen, and the unsaponified graft copolymer is thus of no use as an absorbent as discussed by Fanta, *Block and Graft Copolymerization,* R. J. Ceresa, ed., John Wiley and Sons, 1973, Chapter 2. The prior art also teaches that when mineral acid is added to a saponified absorbent starch graft copolymer composition, to convert alkali metal carboxylate substituents in the synthetic moiety to free carboxylic acid, the saponified polymer no longer retains its absorbent properties but precipitates from dispersion as a solid which has a limited absorptive capacity for aqueous fluids.

In view of the limited absorptive capacity shown by unsaponified starch-PAN and also by the saponified polymer in which the organic acid substituents are in the free acid form rather than as the alkali metal carboxylate, we were surprised to find that starch graft copolymers prepared from some acrylic comonomer-acrylonitrile mixtures, particularly $AASO_3H$-acrylonitrile and acrylic acid-acrylonitrile, functioned as absorbents for aqueous fluids, even though they were unsaponified and at a pH as low as about 2.5. The preferred mole ratio range of comonomer to acrylonitrile is from about 15:85 to about 85:15. For example, a gelatinized starch graft copolymer containing 54.5% synthetic polymer and prepared from a 31:69 mole ratio of $AASO_3H$:acrylonitrile absorbed 580 g. of water, 21 g. of synthetic urine, and 21 g. of 1% sodium chloride solution per gram of graft copolymer. A similar graft copolymer prepared from a 10:90 mole ratio of $AASO_3H$:acrylonitrile absorbed only 5 g. of water per gram of graft copolymer. When 5 g. of the 31:69 graft copolymer was dispersed with rapid stirring in 750 ml. of water, the pH of the dispersion was 2.5, and the dispersion was highly viscous. At this low pH, all saponified starch-PAN absorbent compositions known in the prior art would precipitate from aqueous dispersion. It was also surprising that the absorbency of the 31:69 graft copolymer was not greatly improved by converting the free sulfonic acid substituents to sodium sulfonate. The dry graft copolymer in the sodium sulfonate form absorbed only 22 g. of synthetic urine and 24 g. of 1% sodium chloride solution per gram of polymer.

Granular starch graft copolymers prepared via ferrous sulfate-hydrogen peroxide initiation from monomer mixtures which contain high ratios of acrylic acid to acrylonitrile also function as thickeners and as absorbents, without the need for saponification. For example, when a graft copolymer prepared from granular starch and a 5:1 ratio, by weight (79:21 mole ratio), of acrylic acid:acrylonitrile was dispersed in water at a concentration of 1 g. in 200 ml., neutralized with sodium hydroxide, and heated briefly to 95° C., a dispersion with a Brookfield viscosity of 4700 cps. (25° C., 30 r.p.m.) was obtained. Air drying a similarly prepared dispersion yielded a film which absorbed 163 g. of water per gram of polymer. An analogous product prepared from a 2:1 ratio by weight (60:40 mole ratio) of acrylic acid:acrylonitrile absorbed 113 g. of water per gram of polymer.

Obviously, if one can prepare an absorbent starch graft copolymer without the need for a saponification step, a considerable savings in cost of production can be realized. Perhaps of greater importance is the fact that the $AASO_3H$-acrylonitrile compositions function as absorbents and as thickeners for aqueous fluids at pH values as low as about 2. There are many instances where it is necessary to thicken or absorb highly acidic aqueous fluids. Under these conditions, the instant absorbent compositions would still have the desired thickening and absorbing properties, whereas any starch graft copolymer absorbent composition known in the prior art would have very limited use.

Absorbent saponified starch-PAN graft copolymer compositions known in the prior art typically have absorbency values on the order of 800–1000 g. of deionized water per gram of polymer, and we have confirmed this range by preparing a control composition from gelatinized starch with an absorbency value of 820. Higher absorbencies have been obtained only by using special techniques. For example, U.S. Pat. No. 3,935,099 describes a saponified starch-PAN graft copolymer composition which was isolated, purified, and dried in the carboxylic acid form and then packed loosely into a column. When gaseous ammonia was passed up the column, the composition was converted to the ammonium carboxylate form, which absorbed 1300 g. of water and 80 g. of synthetic urine per gram of polymer. U.S. Pat. No. 3,935,099 also describes a saponified starch-PAN graft copolymer composition which was dispersed in water at a concentration of 1% solids, sonified at 20 kHz for about 1 hr. to reduce viscosity from 30,000 cp. to 30 cp., and finally allowed to dry to a film. When the film was heated in a vacuum oven for 30 min. at 160° C., an absorbent composition was obtained which absorbed 2000 g. of deionized water per gram of polymer.

In view of the difficult and involved techniques used to prepare these ultra-high absorbent compositions, we were surprised to discover that absorbencies for deionized water in excess of 1000 g. per gram of polymer could be readily obtained if minor amounts of selected acrylic comonomers were mixed with acrylonitrile when the graft copolymer was prepared. Preferred mole ratios of acrylic comonomer:acrylonitrile range from 1:99 to 15:85. For example, a deionized water absorbency of 1320 g. per gram of polymer was observed for a saponified gelatinized starch graft copolymer prepared from a monomer mixture containing $AASO_3H$ and acrylonitrile in a mole ratio of 1:99. Mole ratios of 5:95 and 10:90 gave water absorbencies of 2880 and 5300 g. per gram of polymer, respectively. Similarly, when gelatinized starch was graft polymerized with acrylic acid and acrylonitrile in a mole ratio of 10:90, the saponified absorbent composition showed a water absorbency of 1590 g. per gram of polymer. High absorbencies for synthetic urine were also observed, especially if the graft copolymer prepared from $AASO_3H$ and acrylonitrile was isolated and dried in the sulfonic acid form, rather than as the sodium sulfonate, prior to saponification. For example, one such absorbent composition, prepared from $AASO_3H$ and acrylonitrile in a mole ratio of 5:95, showed a synthetic urine absorbency of 87 g. per gram of polymer.

It has also been observed that certain vinyl comonomers behave similarly to the acrylic comonomers when admixed with acrylonitrile and graft polymerized onto a PHP substrate. For example, a saponified gelatinized starch graft copolymer prepared from a monomer mixture containing vinyl sulfonic acid and acrylonitrile in a mole ratio of 5:95 has a deionized water absorbency of 1200 g. per gram of polymer. However, as noted above and also in Example 20 in Table 5, vinyl sulfonic acid does not have the effect of shortening the saponification time.

Although most of the absorbent compositions cited in the examples are isolated by dialysis followed by drying to a film at room temperature, it is obvious that any of the isolation methods known in the prior art including those in U.S. Pat. No. 3,935,099 may be used. These methods include alcohol precipitation, drum drying, freeze drying, spray drying, and flash drying. The dried PHP-SC is water-insoluble and has a moisture content preferable in the range of about 1 to 15% by weight.

An important application for the instant PHP-SC absorbent polymer compositions is the reduction of the water content of emulsions, suspensions, and dispersions. For example, when a sample of skim milk containing 9.9% solids was mixed with 1%, by weight, of the absorbent of Example 9B and the mixture let stand for 30 min. and then screened to remove water-swollen absorbent polymer, the solids content of the unabsorbed liquid was increased to 11.8%.

Another important application is the coating of various substrates to increase their water-holding capacity. For example, when 1%, by weight, of the absorbent polymer of Example 9B was dried down onto a sample of sand, a 5-g. sample of the coated sand absorbed 5.18 g. of water, as compared with 1.26 g. of water for 5 g. of uncoated sand.

Another application for these absorbent polymers is the solidification of sewage sludge and other waste materials to facilitate handling and drying. For example, when municipal sewage sludge, which contained 1.45% solids was mixed with the absorbent polymer of Example 9B at a concentration of 1.57 parts of polymer per 100 parts of sludge, the sludge was solidified to a mass which could be easily trucked or otherwise transported without pumping.

Another application for these absorbent polymers is as thickening agents for aqueous systems. Although films or particles of these absorbent compositions retain their integrity as they swell and imbibe water, it is obvious that a film or particle which has imbibed several hundred times its weight of water will not possess a large degree of mechanical strength and can therefore be broken up with a minimum of effort to give a smooth, viscous dispersion. It is also obvious that a film which has imbibed over 1000 times its weight of water will possess even less strength and will therefore be even more easily reduced to a dispersion which exhibits the smoothness and lack of graininess which is desired. The ultra-high absorbency products of the instant invention are thus particularly well suited for use as thickeners. Moreover, since the absorbent polymer compositions swell rapidly but do not actually dissolve, they do not show the undesirable tendency to form surface-hydrated lumps or "gumballs", which is so prevalent in prior art thickeners.

Since the prior art (U.S. Pat. No. 3,935,099) discloses the use of saponified starch-PAN for the entrapment and immobilization of enzymes, it is obvious that the instant absorbent polymers would also function for this application. There are also numerous other applications for these graft copolymer absorbents which are not specifically listed but which will be obvious to those skilled in the art.

The following examples are intended only to further illustrate the invention and are not intended to limit the scope of the invention which is defined by the claims.

EXAMPLE 1

A 500-ml. resin flask was charged with 10.0 g. (dry basis) of unmodified granular corn starch (moisture content: 14%) and 167 ml. of distilled water. The stirred slurry was heated on a steam bath for 30 min. at 85° C. while a slow stream of nitrogen was allowed to bubble through the dispersion. The dispersion of gelatinized starch was then cooled to 25° C., and 11.7 g. (0.0566 mole) of $AASO_3H$ and 6.71 g. (0.1264 mole) of acrylonitrile added. This monomer mixture contains 31% $AASO_3H$ on a mole basis and 63.5% $AASO_3H$ on a weight basis. A solution of 0.338 g. of ceric ammonium nitrate in 3 ml. of 1N nitric acid was added and the mixture stirred for 2 hr. at 25°–29° C. while controlling the exotherm with an ice bath. The reaction was terminated by addition of 200 ml. of ethanol and the mixture centrifuged. The swollen rubbery solid was extracted first with ethanol and then with acetone and was finally spread onto a "Teflon" tray and allowed to air dry. The yield of air-dried graft copolymer was 22.0 g., which corresponds to 54.5% add-on. The graft copolymer was Wiley-milled through a 20-mesh screen.

EXAMPLE 2

A 0.0342-g. sample of the product of Example 1 was added to 50 ml. of distilled water and the mixture allowed to stand overnight to fully hydrate the polymer. Swollen polymer particles were then separated from unabsorbed water by screening through a tared 325-mesh sieve which was 4.8 cm. in diameter. The mixture on the sieve was allowed to drain for 10 min. and the sieve was then weighed to determine the weight of water-swollen gel (19.8 g.). The water absorbency was calculated as 580 g./g. of polymer.

A similar absorbency test with synthetic urine (97.07% distilled water, 1.94% urea, 0.80% NaCl, 0.11% $MgSO_4.7H_2O$, 0.06% $CaCl_2$) gave 21 g./g. of polymer.

A similar absorbency test with 1% sodium chloride solution gave 21 g./g. of polymer.

EXAMPLE 3

5.0 g. of the graft copolymer from Example 1 was added to 750 ml. of water in a Waring Blendor. The mixture was stirred rapidly, and the initial pH of 2.5 was adjusted to 7.7 by addition of dilute sodium hydroxide. The mixture was spread onto a "Teflon" tray and allowed to air dry to a film.

An absorbency test of the film, similar to that of Example 2, gave 22 g. of synthetic urine per gram of polymer and 24 g. of 1% sodium chloride solution per gram of polymer. With distilled water, the gel was too swollen and tender to screen, to a meaningful test was not obtained.

EXAMPLES 14–17

Graft copolymers from gelatinized starch were prepared as in Examples 8A–10A, and graft copolymers from granular starch were prepared as in Examples 11–13, with the exception that acrylamide was substituted for AASO$_3$H. Reactions are summarized in Table 4.

Graft copolymers were saponified as in Examples 8B–10B, and the fluid absorbencies of the resulting absorbent compositions were determined as in Examples 4C–6C.

Table 3

| Example | AN, g. | AASO$_3$H, g. | Mole %, AASO$_3$H | Wt. %, AASO$_3$H | % Add-on | Saponification time, min. | Absorbency of saponified product, g./g. | |
|---|---|---|---|---|---|---|---|---|
| | | | | | | | Water | Synthetic urine |
| Control | 15 | 0 | 0 | 0 | 55 | 75 | 298 | 28 |
| 11 | 14.9 | 0.59 | 1 | 3.8 | 57 | — | 377 | 33 |
| 12 | 14.3 | 2.93 | 5 | 17 | 56 | — | 568 | 39 |
| 13 | 13.6 | 5.86 | 10 | 30.1 | 54 | 30 | 968 | 47 |

Table 4

| Example | Granule state | AN, g. | AA[1], g. | Mole %, AA | Wt. %, AA | % Add-on | Saponification time, min. | Absorbency of saponified product, g./g. | |
|---|---|---|---|---|---|---|---|---|---|
| | | | | | | | | Water | Synthetic urine |
| Control | Gelatinized | 15 | 0 | 0 | 0 | 59 | 90 | 820 | 40 |
| 14 | Gelatinized | 13.6 | 2.01 | 10 | 12.9 | 60 | 27 | 883 | 43 |
| 15 | Gelatinized | 12 | 4.02 | 20 | 25 | 60 | 13 | 660 | 28 |
| Control | Granular | 15 | 0 | 0 | 0 | 55 | 75 | 298 | 28 |
| 16 | Granular | 13.6 | 2.01 | 10 | 12.9 | 58 | — | 464 | 34 |
| 17 | Granular | 12 | 4.02 | 20 | 25 | 58 | 12 | 298 | 30 |

[1]AA = acrylamide.

EXAMPLES 18–22

Graft copolymers from gelatinized starch were prepared as in Examples 8A–10A, with the exception that either acrylic acid, methyl acrylate, vinyl sulfonic acid, or methyl methacrylate was substituted for AASO$_3$H. Reactions are summarized in Table 5.

Graft copolymers were saponified as in Examples 8B–10B, and the fluid absorbencies of the resulting absorbent compositions were determined as in Examples 4C–6C.

EXAMPLE 23

A mixture of 8.0 g. (dry basis) of granular starch, 12 g. of acrylonitrile, and 2 ml. of water in a 2-oz. screw cap bottle was blended with a spatula and the resulting paste evacuated to 100 mm. and repressured with nitrogen a total of four times. Assuming that the loss in weight due to evacuation was all acrylonitrile, the acrylonitrile remaining in the bottle now amounted to 11.68 g. The bottle was placed in an ice bath for 30 min. and was then irradiated with Cobalt-60 to a total dose of 0.25 Mrad. After irradiation, the mixture was allowed to stand at ambient temperature for 2 hr. and was then washed with water and dried in vacuo at 60° C. to yield 17.0 g. of polymer. Exhaustive extraction with dimethylformamide afforded 15.76 g. of graft copolymer with an add-on of 48% and 0.98 g. of ungrafted PAN.

The graft copolymer was saponified as in Examples 4B–6B and the fluid absorbencies of the resulting absorbent compositions were determined as in Examples 4C–6C. The absorbent composition absorbed 267 g. of deionized water and 28 g. of synthetic urine per gram of polymer.

Table 5

| Example | AN, g. | Comonomer, g. | Mole %, comonomer | Wt. %, comonomer | % Add-on | Saponification time, min. | Absorbency of saponified product, g./g. | |
|---|---|---|---|---|---|---|---|---|
| | | | | | | | Water | Synthetic urine |
| Control | 15 | None | 0 | 0 | 52 | 90 | 820 | 40 |
| 18[1] | 13.6 | Acrylic acid (2.04) | 10 | 13.1 | 48 | 20 | 1590 | 47 |
| 19[2] | 14.3 | Acrylic acid (1.02) | 5 | 6.6 | 49 | 30 | 1460 | 42 |
| 20 | 14.3 | Vinyl sulfonic acid (1.53) | 5 | 9.7 | 56 | 105 | 1200 | 49 |
| 21 | 13.6 | Methyl acrylate (2.43) | 10 | 15.2 | 61 | 40 | 1030 | 38 |
| 22 | 13.6 | Methyl methacrylate (2.83) | 10 | 17.3 | 60 | 95 | 422 | 26 |

[1]A four-fold excess of ceric ammonium nitrate (1.352 g. in 12 ml. of 1N nitric acid) was required to initiate polymerization.
[2]A two-fold excess of ceric ammonium nitrate (0.676 g. in 6 ml. of 1N nitric acid) was required to initiate polymerization.

EXAMPLE 24

Nitrogen was bubbled through a suspension of 180 g. of granular corn starch in 1500 ml. of distilled water for 30 min. at room temperature. To this suspension 0.8 g. of FeSO$_4$.7H$_2$O in 30 ml. of water was added, and after the mixture was stirred for 1 min., 160 g. of acrylonitrile and 20 g. of acrylic acid were added. The mixture was stirred an additional 5 min., and 200 ml. of a 1.2% H$_2$O$_2$ solution was then added dropwise over a 20-min. period. The mixture was stirred for 3 hr. under nitrogen, the filtered and the insoluble product washed twice with water.

EXAMPLE 4–6

A. Dispersions of gelatinized starch in water were prepared as in Example 1 and were cooled to 25° C. Acrylonitrile and AASO$_3$H were added (0.283 total moles) followed by a solution of 0.338 g. of ceric ammonium nitrate in 3 ml. of 1N nitric acid. Mixtures were stirred for 2 hr. at 25°–27° C. while controlling the exothermic reactions with an ice bath. Reactions were terminated by addition of 200 ml. of ethanol and the mixtures filtered. Solids were washed with ethanol and dried overnight in a 60° C. vacuum oven. Reactions are summarized in Table 1.

B. One gram of each graft copolymer from Examples 4A–6A was weighed into a 125-ml. Erlenmeyer flask and 20 ml. of 0.5N sodium hydroxide solution added. Mixtures were heated on a steam bath until they thickened sufficiently to preclude settling (about 10–15 min.), and the resulting slurries were then heated in a 95°–100° C. oven for 2 hr. Saponification mixtures were diluted with 400 ml. of water and dialyzed against distilled water until a near-neutral pH was reached (6.3–7.1). Dispersions were poured onto "Teflon" sheets and dried in a forced air oven at about 35° C. to give the absorbent compositions in the form of brittle films.

C. About 20 mg. of each absorbent composition from Examples 4B–6B was accurately weighed and added to 50 ml. of water. Mixtures were allowed to stand for 30 min., and the swollen polymer particles were then separated from unabsorbed water by screening, as in Example 2. The swollen polymer on the sieve was allowed to drain for 10–30 min., depending on ease of drainage, and the sieve was weighed to determine the weight of water-swollen gel. Absorbencies (Table 1) were then calculated as grams of water per gram of absorbent composition.

Similar absorbency tests were run with about 70 mg. of each absorbent composition and a synthetic urine identical to that used in Example 2.

nium nitrate initiation, as described in Examples 4A–6A. After a reaction time of 2 hr., the pH of the reaction mixture was adjusted to 7.0 by addition of sodium hydroxide solution. Ethanol (200 ml.) was added, and the reaction products were filtered, washed, and dried as in Examples 4A–6A. Reactions are summarized in Table 2.

B. Sodium hydroxide saponifications of the graft copolymers prepared in Examples 8A–10A were carried out as in Examples 4B–6B. When heated with sodium hydroxide, graft copolymers rapidly assume a red-orange color, which then slowly fades to light yellow as the reaction nears completion. The progress of a saponification can thus be followed by the color of the reaction mass, and a light yellow color indicates that saponification is complete. Each saponification time in Table 2 is the amount of time it takes for the sample to fade to a light yellow color after it was placed in the 95°–100° C. oven. Saponification mixtures were diluted, dialyzed to a pH of 6.4–7.0, and dried down to brittle films as in Examples 4B–6B.

C. Absorbency tests with water and synthetic urine were run as in Examples 4C–6C, and the results appear in Table 2. For absorbent compositions with absorbencies over 2000 g./g., as little as 1–2 mg. of the absorbent composition was added to 50 ml. of water, since the use of larger quantities resulted in excess gel volume and thus gave poor drainage on the sieve.

Table 2

| Example | AN, g. | AASO$_3$H, g. | Mole %, AASO$_3$H | Wt. %, AASO$_3$H | % Add-on | Saponification time, min. | Absorbency of saponified product, g./g. | |
|---|---|---|---|---|---|---|---|---|
| | | | | | | | Water | Synthetic urine |
| Control | 15 | 0 | 0 | 0 | 59 | 90 | 820 | 40 |
| 8 | 14.9 | 0.59 | 1 | 3.8 | 58 | 65 | 1320 | 58 |
| 9 | 14.3 | 2.93 | 5 | 17 | 56 | 32 | 2880 | 62 |
| 10 | 13.6 | 5.86 | 10 | 30.1 | 58 | 28 | 5300 | 73 |

EXAMPLES 11–13

A 500-ml. resin flask was charged with 10.0 g. (dry basis) of unmodified granular corn starch and 167 ml. of distilled water, and the stirred slurry was purged with a slow stream of nitrogen at 25° C. for 1 hr. Acrylonitrile and AASO$_3$H were added (0.283 total moles) followed by a solution of 0.338 g. of ceric ammonium nitrate in 3 ml. of 1N nitric acid. The mixture was stirred for 2 hr. at 25°–27° C., sodium hydroxide solution was then added to give a pH of 7.0, and the reaction mixture was Table 1

| Example | AN, g. | AASO$_3$H, g. | Mole %, AASO$_3$H | Wt. %, AASO$_3$H | % Add-on | Absorbency of saponified product, g.g.[1] | |
|---|---|---|---|---|---|---|---|
| | | | | | | Water | Synthetic urine |
| 4 | 14.7 | 1.17 | 2 | 7.4 | 57 | 1485 | 50 |
| 5 | 14.3 | 2.93 | 5 | 17 | 56 | —[2] | 87 |
| 6 | 13.6 | 5.86 | 10 | 30 | 56 | —[2] | —hu 2 |

[1] g./g. = grams of absorbed substance per gram absorbent composition.
[2] Gel was too swollen and tender to screen accurately.

EXAMPLE 7

The absorbency of the unsaponified starch graft copolymer of Example 6A was determined as in Example 2. The absorbency was 5 g. of water per gram of polymer.

EXAMPLES 8–10

A. Mixtures of acrylonitrile and AASO$_3$H were graft polymerized onto gelatinized starch, with ceric ammofinally diluted with 200 ml. of ethanol. The graft copolymer was removed by filtration, washed with ethanol, and dried overnight in a 60° C. vacuum oven. Reactions are summarized in Table 3.

Graft copolymers were saponified as in Examples 8B–10B, and the fluid absorbencies of the resulting absorbent compositions were determined as in Examples 4C–6C.

EXAMPLE 25

The wet filter cake from Example 24 was suspended in 2500 ml. of water containing 100 g. of KOH in a steam-heated sigma-blade mixer. After the mixture had stirred for 45 min. at 90°–100° C., the color changed from orange to yellow, which indicated that the saponification was complete. The pH of the reaction mixture was adjusted to 8.5 with 1N $H_2SO_4$ and a portion of the product was air dried to give a film, which absorbed 200 ml. of water per gram and 30 ml. of synthetic urine per gram of polymer. For these tests, 1 g. of polymer film was allowed to soak for 1 hr. in 500 ml. of water or 100 ml. of synthetic urine solution. The suspension was then screened through a 60-mesh sieve (23 cm. diameter) and the volume of unabsorbed water measured after a drain time of 15–30 min. The amount of water absorbed was obtained by subtracting the volume of unabsorbed water from 500 ml.

A second portion of the saponificate was drum dried to give a product, which absorbed 200 ml. of water per gram and 45 ml. of synthetic urine per gram of polymer.

A third portion of the saponificate was diluted and dialyzed against distilled water for 48 hr. It was then air dried to form a film, which absorbed 790 ml. of water per gram and 40 ml. of synthetic urine per gram of polymer.

EXAMPLE 26

Granular starch (184 g.), 184 g. of acrylonitrile, 1500 ml. of water, 0.8 g. of $FeSO_4\cdot7H_2O$, and 200 ml. of 1.2% $H_2O_2$ were allowed to react as in Example 24 and the product isolated in a similar manner. Nitrogen analysis gave 13.67% N.

EXAMPLE 27

The wet filter cake from Example 26 was suspended in 3000 ml. of water and treated with 110 g. of NaOH as described in Example 25. Saponification was complete after 50 min. and gave a brownish-yellow saponificate.

A 20-g. portion of the saponificate was diluted with 400 ml. of water in a blendor and air dried to give a film which absorbed 200 ml. of water per gram and 42 ml. of synthetic urine per gram of polymer.

EXAMPLE 28

Granular starch (180 g.), 160 g. of acrylonitrile, 20 g. of acrylamide, 1500 ml. of water, 0.8 g. of $FeSO_4\cdot7H_2O$, and 200 ml. of 1.2% $H_2O_2$ were combined as in Example 24. After 3 hr., the reaction mixture was filtered and the insoluble product was washed with water.

EXAMPLE 29

The wet filter cake from Example 28 was treated with 3000 ml. of water and 110 g. of KOH as in Example 25. After 40 min., the yellow saponification mixture was treated with 1N $H_2SO_4$ to give a pH of 9.1. A portion of this mixture was diluted with water and air dried to give a film which absorbed 250 ml. of water per gram and 25 ml. of synthetic urine per gram of polymer.

A second portion of the sample was drum dried to give a product which absorbed 150 ml. of water per gram and 40 ml. of synthetic urine per gram of polymer.

A third portion was diluted with water and dialyzed against distilled water for 48 hr. The resulting dispersion was air dried to give a film which absorbed 420 ml. of water and 35 ml. of synthetic urine per gram of polymer.

EXAMPLE 30

Granular starch (180 g.), 130 g. of acrylonitrile, 50 g. of acrylamide, 1500 ml. of water, 0.8 g. of $FeSO_4\cdot7H_2O$, and 200 ml. of 1.2% $H_2O_2$ were combined as in Example 24. After 3 hr., the mixture was filtered and the insoluble product washed with water. Nitrogen analysis gave 10.22% N.

EXAMPLE 31

The wet filter cake from Example 30 was treated with 3000 ml. of water and 110 g. of KOH as in Example 25. After 35 min., saponification was complete and the mixture was then treated with 1N $H_2SO_4$ to give a pH of 9.5. A portion of the saponificate was diluted with water and air dried to give a film which absorbed 150 ml. of water and 32 ml. of synthetic urine per gram of polymer.

A second portion of the saponificate was drum dried to give a product which absorbed 150 ml. of water and 30 ml. of synthetic urine per gram of polymer.

A third portion was dialyzed against distilled water for 48 hr. and air dried to give a film which absorbed 545 ml. of water and 30 ml. of synthetic urine per gram of polymer.

EXAMPLE 32

Granular starch (180 g.), 160 g. of acrylonitrile, 20 g. of $AASO_3H$, 1500 ml. of water, 0.8 g. of $FeSO_4\cdot7H_2O$, and 200 ml. of 1.2% $H_2O_2$ were allowed to react as in Example 24. After 3 hr., the reaction mixture was filtered and the insoluble graft copolymer washed with water. Nitrogen analysis gave 11.02% N.

EXAMPLE 33

The wet filter cake from Example 32 was treated with 2500 ml. of water and 110 g. of KOH as in Example 25. After 45 min., the saponification was complete, and 1N $H_2SO_4$ was added until a pH of 8.0 was obtained. A portion of the saponificate was diluted with water and air dried to give a film which absorbed 225 ml. of water and 35 ml. synthetic urine per gram of polymer.

A second portion of the product was drum dried to yield a product which absorbed 150 ml. of water and 30 ml. of synthetic urine per gram of polymer.

A third portion of the saponification was diluted and dialyzed against distilled water for 48 hr. and air dried to give a film which absorbed 375 ml. of water and 30 ml. of synthetic urine per gram of polymer.

EXAMPLE 34

Granular starch (50 g.), 10 g. of acrylonitrile, 50 g. of acrylic acid, 0.2 g. of $FeSO_4\cdot7H_2O$, 100 ml. of 0.6% $H_2O_2$, and 500 ml. of water were combined as in Example 24. After the mixture had stirred for 3 hr., it was filtered, and the precipitate was washed with water, filtered, washed with acetone, filtered, and air dried. The yield of graft copolymer was 62 g.

EXAMPLE 35

A 1.0-g. portion of the product from Example 34 was neutralized with NaOH and diluted with water to 200 g. This suspension was cooked at 95° C. for 10 min. to give a smooth dispersion which exhibited a Brookfield viscosity of 4700 cps. at 25° and 30 r.p.m.

EXAMPLE 36

To 28 g. of the sample from Example 34 in 400 ml of water was added a solution of 10 g. of KOH in 100 ml. of water. The mixture was stirred in a steam-heated sigma-blade mixer. After 15 min., the light yellow transparent gel was cooled to room temperature.

A 100-g. portion of the gel was diluted with 300 ml. of water, and 1 ml. of 1:1 $H_2SO_4:H_2O$ was added to give a pH of 8.3. The resulting dispersion was air dried to give a film, which absorbed 160 g. of water per gram of polymer, when tested by the method of Examples 4C–6C.

EXAMPLE 37

A 1.0-g. portion of the product from Example 34 was heated in water at 95° C. for 1 min. and then neutralized with NaOH to give a pH of 8.0. The resulting dispersion was air dried to give a film which absorbed 163 g. of water per gram of polymer, when tested by the method of Examples 4C–6C.

EXAMPLE 38

Granular starch (60 g.), 20 g. of acrylontrile, 40 g. of acrylic acid, 0.25 g. of $FeSO_4.7H_2O$, 100 ml. of 0.7% $H_2O_2$, and 500 ml. of water were combined as in Example 34. After 3 hr., the reaction mixture was filtered. The precipitate was first suspended in water and centrifuged and was then washed with acetone, filtered, and air dried to yield 76.5 g. of graft copolymer. Nitrogen analysis gave 2.58% N.

EXAMPLE 39

A 1.0-g. portion of the product from Example 38 was suspended in 250 ml. of water and titrated with NaOH solution, while heating with steam (1.7 milliequivalents of NaOH were required to reach a phenolphthalein end point). When the mixture was diluted to 380 g., it exhibited a Brookfield viscosity of 692 cp. at 30 r.p.m. and 25° C.

EXAMPLE 40

A portion of the sample from Example 38 was titrated with NaOH to a phenolphthalein end point and the dispersion heated at 95° C. for 1 min. The resulting suspension was diluted with water and air dried to give a colorless translucent film, which absorbed 113 g. of water per gram of polymer when tested by the method of Examples 4C–6C.

EXAMPLE 41

A 500-ml. resin flask was charged with 10.0 g. (dry basis) of unmodified granular corn starch and 167 ml. of distilled water, and the stirred slurry was purged with a slow stream of nitrogen at 25° C. for 1 hr. Methyl acrylate (15.0 g.) was added followed by a solution of 0.338 g. of ceric ammonium nitrate in 3 ml. of 1N nitric acid. The mixture was stirred for 2 hr. at 25°–28° C., washed with water and ethanol and dried in vacuo at 40° C. to yield 21.2 g. of polymer. A 20.3-g. portion of the product was moistened with 10 ml. of water and then exhaustively extracted with benzene to yield 18.9 g. of graft copolymer with 47% add-on and 1.2 g. of ungrafted poly(methyl acrylate).

The graft copolymer was saponified as in Examples 4B–6B and the fluid absorbencies of the resulting absorbent compositions were determined as in Examples 4C–6C. The absorbent composition absorbed 532 g. of deionized water and 20 g. of synthetic urine per gram of polymer.

EXAMPLE 42

This example shows the utility of the instant absorbent polymers for concentrating aqueous emulsions or dispersions.

A 10-ml. of sample of skim milk containing 9.9% solids was mixed with 0.10 g. of the absorbent polymer composition of Example 9B and the mixture allowed to stand for 30 min. Unabsorbed liquid was separated by screening through a 325-mesh sieve. This unabsorbed liquid contained 11.8% solids.

EXAMPLE 43

This example shows the utility of the instant absorbent polymers for the coating of various substrates to increase their water-holding capacity.

A dispersion of 0.10 g. of the absorbent polymer composition of Example 9B in 10 ml. of water was prepared, and 10.0 g. of sand was mixed into the viscous dispersion. The resulting mixture was allowed to air dry. A 5.0-g. portion of the coated sand was weighed into a small beaker, and deionized water was added until no more water was absorbed. The amount of water absorbed by the coated sand was 5.18 g., as compared with 1.26 g. of water for a 5.0-g. sample of uncoated sand.

EXAMPLE 44

This example illustrates the utility of the instant absorbent polymers for solidifying sewage sludge and other waste materials to facilitate handling.

The absorbent polymer composition of Example 9B was added portionwise to a weighed sample of muncipal sewage sludge which contained 1.45% solids and had a pH of 6.7. At a concentration of 1.57 g. of absorbent polymer per 100 g. of sludge, the sludge was solidified to a heavy-bodied, gelatinous mass which could be easily trucked or otherwise transported without pumping.

EXAMPLE 45

This example illustrates the utility of the instant absorbent polymers as thickening agents for aqueous systems.

A smooth 2% dispersion of the product of Example 4B in 5% sodium chloride solution was prepared by adding the dry polymer film to the sodium chloride solution, allowing the mixture to stand overnight, and then mixing briefly with a stirring rod. The dispersion viscosity was 1050 cp. at 100 sec$^{-1}$. A viscosity of 394 cp. (100 sec$^{-1}$) was observed for a similar dispersion prepared from the production of Example 6B.

It is to be understood that the foregoing detailed description is given by way of illustration and that modification and variations may be made therein without departing from the spirit and scope of the invention.

We claim:

1. A method of preparing water-insoluble, aqueous fluid-absorbing compositions comprising the following steps:
   a. graft polymerizing acrylonitrile and at least one water-soluble acrylic comonomer selected from the group consisting of 2-acrylamido-2-methylpropanesulfonic acid, acrylamide, acrylic acid, and methyl acrylate onto a polyhydroxy polymer substrate, thereby forming a water-insoluble graft copolymer, wherein the copolymerized acrylonitrile and acrylic comonomer comprise a synthetic copolymer moiety of said graft copolymer, and the mole percent ratio of acrylic comonomer:acrylonitrile in said synthetic copolymer moiety is from about 1:99 to about 85:15, and wherein the weight ratio of polyhydroxy polymer:synthetic copolymer moiety is in the range of 75:25 to 25:75;

b. saponifying said graft copolymer from step (a) to form a water-soluble saponified graft copolymer;

c. drying said water-soluble graft copolymer from step (b) to a moisture level in the range of about 1 to 15% water by weight, whereby said graft copolymer is rendered water insoluble;

d. and recovering said graft copolymer from step (c).

2. The method as described in claim 1 wherein said polyhydroxy polymer substrate is granular starch.

3. The method as described in claim 1 wherein said polyhydroxy polymer substrate is gelatinized starch.

4. The method as described in claim 1, wherein said saponification in step (b) is conducted in an aqueous slurry with an alkali in amounts such that the molar ratio of alkali to monomeric unit of synthetic copolymer of said graft copolymer is from about 0.1:1 to about 7.2:1.

5. The method as described in claim 1, wherein in step (a) said polyhydroxy polymer substrate is selected from the group of granular starch and gelatinized starch and said acrylic comonomer is acrylamide in an acrylamide:acrylonitrile mole percent ratio of about 20:80.

6. The method as described in claim 1, wherein in step (a) said polyhydroxy polymer substrate is granular starch and said acrylic comonomer is 2-acrylamido-2-methylpropanesulfonic acid in a 2-acrylamido-2-methylpropanesulfonic acid:acrylonitrile mole percent ratio of about 10:90.

7. The method as described in claim 1, wherein the step (a) said polyhydroxy polymer substrate is gelatinized starch and said acrylic comonomer is selected from the group consisting of 2-acrylamido-2-methylpropanesulfonic acid and acrylic acid in a comonomer:acrylonitrile mole percent ratio of from about 1:99 to about 15:85.

8. Aqueous fluid-absorbing compositions comprising water-insoluble saponified graft copolymers of a polyhydroxy polymer substrate, acrylonitrile and a water-soluble acrylic comonomer selected from the group consisting of 2-acrylamido-2-methylpropanesulfonic acid, acrylamide, acrylic acid, and methyl acrylate, wherein the copolymerized acrylonitrile and acrylic comonomer comprise a synthetic copolymer moiety and the mole percent ratio of acrylic comonomer:acrylonitrile in said synthetic copolymer moiety is from about 1:99 to about 85:15, and wherein the weight ratio of polyhydroxy polymer:synthetic copolymer moiety is in the range of 75:25 to 25:75.

9. The aqueous fluid-absorbing compositions as described in claim 8 wherein said polyhydroxy polymer substrate is granular starch.

10. The aqueous fluid-absorbing compositions as described in claim 8 wherein said polyhydroxy polymer substrate is gelatinized starch.

11. An aqueous fluid-absorbing composition as described in claim 8, wherein said polyhydroxy polymer substrate is selected from the group of granular starch and gelatinized starch and said acrylic comonomer is acrylamide in an acrylamide-acrylonitrile mole percent ratio of about 20:80.

12. An aqueous fluid-absorbing composition as described in claim 8, wherein said polyhydroxy polymer substrate is granular starch and said acrylic comonomer is 2-acrylamido-2-methylpropanesulfonic acid in a 2-acrylamido-2-methylpropanesulfonic acid:acrylonitrile mole percent ratio of about 10:90.

13. The aqueous fluid-absorbing compositions as described in claim 8 wherein said polyhydroxy polymer substrate is gelatinized starch and said acrylic comonomer is selected from the group consisting of 2-acrylamido-2-methylpropanesulfonic acid and acrylic acid in a comonomer:acrylonitrile mole percent ratio of from about 1:99 to about 15:85, said compositions characterized by the property of absorbing up to about 5300 grams of deionized water per gram of graft copolymer.

* * * * *